(12) United States Patent
Kaminsky et al.

(10) Patent No.: US 8,751,078 B2
(45) Date of Patent: Jun. 10, 2014

(54) OFF-GOING CLUTCH CONTROL

(75) Inventors: Lawrence A. Kaminsky, White Lake, MI (US); Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 580 days.

(21) Appl. No.: 13/087,419

(22) Filed: Apr. 15, 2011

(65) Prior Publication Data

US 2012/0265383 A1 Oct. 18, 2012

(51) Int. Cl.
*B60L 9/00* (2006.01)

(52) U.S. Cl.
USPC .................................. 701/22; 701/36; 701/67

(58) Field of Classification Search
USPC ............. 701/22, 29.2, 67; 180/65.265, 65.26, 180/65.285, 65.235, 65.21, 65.275, 65.25; 318/375; 356/401; 148/102; 250/491.1
See application file for complete search history.

(56) References Cited

U.S. PATENT DOCUMENTS

| | | | | |
|---|---|---|---|---|
| 5,345,310 | A * | 9/1994 | Rostoker et al. | 356/401 |
| 8,061,463 | B2 * | 11/2011 | Kitano et al. | 180/65.285 |
| 8,423,230 | B2 * | 4/2013 | Steinhauser et al. | 701/29.2 |
| 8,544,577 | B2 * | 10/2013 | Kitano et al. | 180/65.285 |
| 2006/0108163 | A1 * | 5/2006 | Kitano et al. | 180/65.2 |
| 2009/0294194 | A1 * | 12/2009 | Kitano et al. | 180/65.265 |
| 2010/0312423 | A1 * | 12/2010 | Steinhauser et al. | 701/22 |
| 2012/0065855 | A1 * | 3/2012 | Naqi et al. | 701/67 |
| 2012/0116618 | A1 * | 5/2012 | Tate et al. | 701/22 |

* cited by examiner

*Primary Examiner* — Behrang Badii
(74) *Attorney, Agent, or Firm* — Quinn Law Group, PLLC

(57) ABSTRACT

A vehicle includes an engine, a motor, and a gearbox. A clutch is configured to engage to transfer a reactive torque to at least one of the engine, the motor, and the gearbox. The clutch is configured to disengage during a transition from a present operating mode to a target operating mode. A controller is configured to determine an expected slip direction of the clutch, define a non-zero value based at least in part on the expected slip direction, and command the reactive torque to the non-zero value to control the clutch to induce slip during the transition from the present operating mode to the target operating mode.

10 Claims, 3 Drawing Sheets

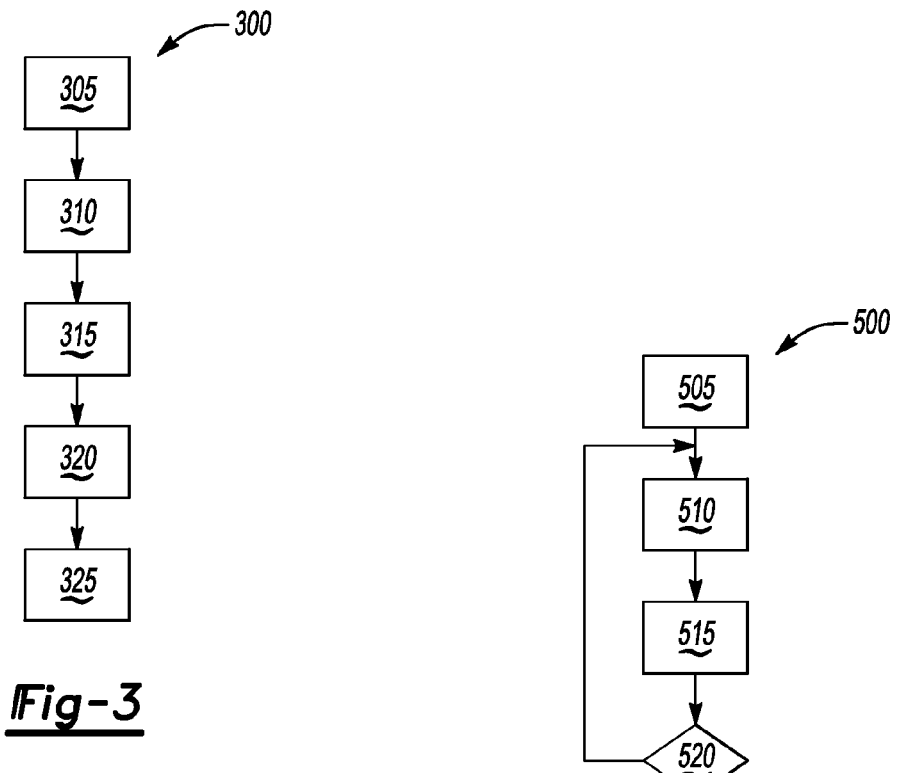
Fig-3
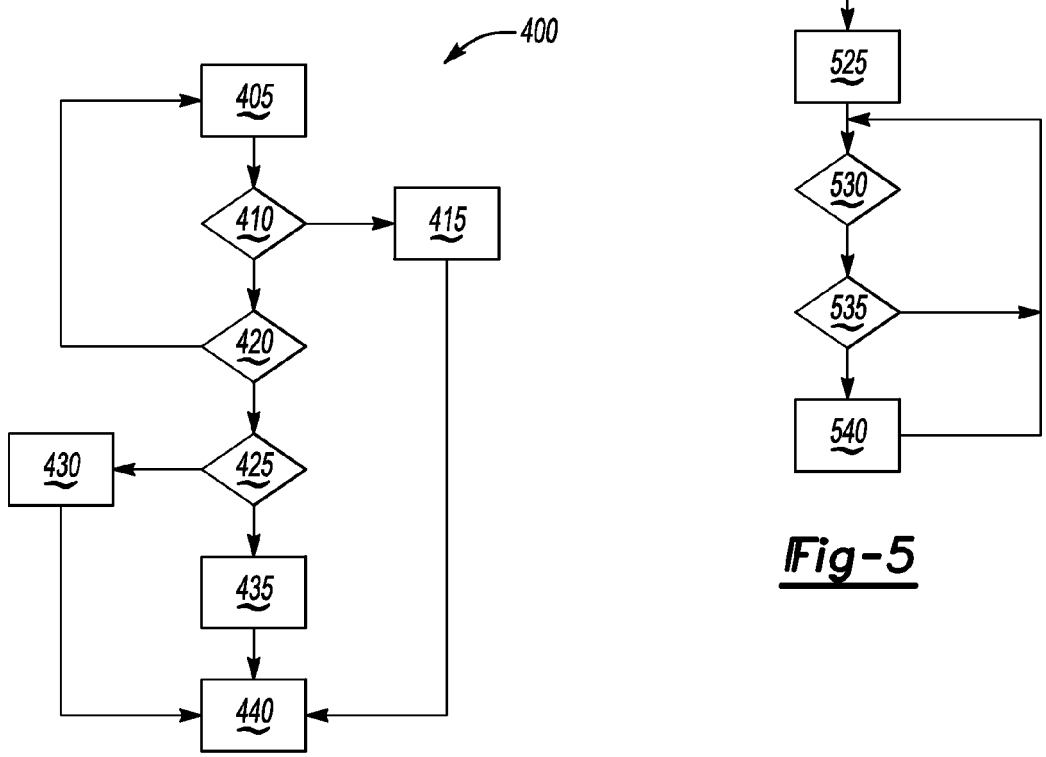
Fig-4
Fig-5

OFF-GOING CLUTCH CONTROL

TECHNICAL FIELD

The disclosure relates to control of an off-going clutch in a vehicle.

BACKGROUND

Passenger and commercial vehicles, including hybrid vehicles, use various clutches to transfer torque between two or more vehicle components. In hybrid vehicles, clutches may be used to transfer torque generated by an engine and/or one or more motors to wheels of the vehicle so that the generated torque may propel the vehicle. Multiple clutches may be used so that the hybrid vehicle can operate in various operating modes (e.g., engine only, motor only, etc.).

SUMMARY

An example vehicle includes an engine configured to generate an engine torque and a motor configured to generate a motor torque. The vehicle further includes a gearbox and a clutch. The gearbox is configured to receive the engine torque or the motor torque. The clutch is configured to engage to transfer a reactive torque to at least one of the engine, the motor, and the gearbox. The clutch is also configured to disengage during a transition from a present operating mode to a target operating mode. The vehicle further includes a controller configured to determine an expected slip direction of the clutch, define a non-zero value based at least in part on the expected slip direction, and command the reactive torque to the non-zero value to control the clutch to induce slip during the transition from the present operating mode to the target operating mode.

An example method of controlling an off-going clutch during a transition to a target operating mode of a hybrid vehicle includes identifying a transition from a present operating mode to a next operating mode along a shift path to the target operating mode and identifying a clutch that is configured to transfer torque in accordance with a reactive torque during the present operating mode and disengage during the transition to the next operating mode as the off-going clutch. Moreover, the method may further include determining an expected slip direction of the off-going clutch, defining a non-zero value based at least in part on the expected slip direction, and controlling the disengagement of the off-going clutch during the transition to the next operating mode based at least in part on the non-zero value.

The above features and the advantages of the present disclosure are readily apparent from the following detailed description of the best modes for carrying out the invention when taken in connection with the accompanying drawings.

BRIEF DESCRIPTION OF THE DRAWINGS

FIG. 3 illustrates a flowchart of an example process that may be implemented by the controller during the transition to the target operating mode.

FIG. 4 illustrates a flowchart of an example process that may be implemented by the controller to determine the expected slip direction of the off-going clutch.

FIG. 5 illustrates a flowchart of an example process that may be implemented by the controller to control the reactive torque of the off-going clutch during the transition to the target operating mode.

DETAILED DESCRIPTION

A vehicle is provided with a controller configured to control an off-going clutch during a transition to a target operating mode of the vehicle. That is, the controller may determine an expected slip direction of the off-going clutch and define a non-zero value based at least in part on the expected slip direction. The controller may further command the reactive torque of the off-going clutch to the non-zero value and disengage the off-going clutch as part of the transition to the target operating mode. The vehicle may take many different forms and include multiple and/or alternate components and facilities. While an example vehicle is shown in the Figures, the components illustrated in the Figures are not intended to be limiting. Indeed, additional or alternative components and/or implementations may be used.

Figure 1:
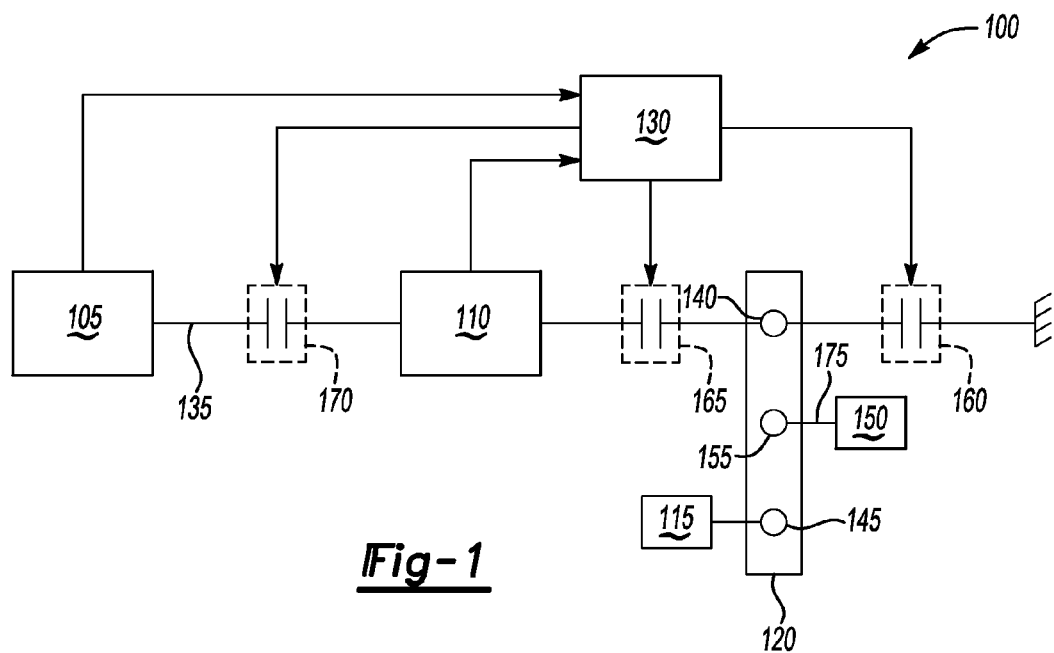
FIG. 1 is a schematic diagram of an example vehicle having a controller configured to control an off-going clutch during a transition to a target operating mode.

FIG. 1 illustrates an example vehicle 100 that includes an engine 105, a first motor 110, a second motor 115, a gearbox 120, and a controller 130. The vehicle 100 may be any passenger or commercial automobile such as a hybrid electric vehicle including a plug-in hybrid electric vehicle (PHEV), an extended range electric vehicle (EREV), or the like.

The engine 105 may include any device configured to generate an engine torque by, e.g., converting a fuel into rotational motion. Accordingly, the engine 105 may be an internal combustion engine configured to convert energy from a fossil fuel into rotational motion using a thermodynamic cycle. The engine 105 may be configured to output the engine torque via a crankshaft 135.

The first motor 110 may include any device configured to generate a first motor torque by, e.g., converting electrical energy into rotational motion. For instance, the first motor 110 may be configured to receive electrical energy from a power source (not shown) such as a battery. The power source may be configured to store and output electrical energy, such as direct current (DC) energy. An inverter (not shown) may be used to convert the DC energy from the battery into alternating current (AC) energy. The first motor 110 may be configured to use the AC energy from the inverter to generate rotational motion. The first motor 110 may be further configured to generate electrical energy when provided with a torque, such as the engine torque. For example, the first motor 110 may generate AC energy that may be converted by the inverter into DC energy and stored in the power source.

The second motor 115 may include any device configured to generate a second motor torque by, e.g., converting electrical energy into rotational motion. Like the first motor 110, the second motor 115 may be configured to receive electrical energy from the power source either directly or via the inverter.

The gearbox 120 may include any device configured to convert the engine torque, the first motor torque, and/or the second motor torque into rotational motion (e.g., a propulsion torque) that may be used to propel the vehicle 100. For instance, the gearbox 120 may include a planetary gearset having a plurality of gears of various sizes. The gearbox 120 may be configured to receive the engine torque and/or the first motor torque via a first input node 140, and the second motor torque via a second input node 145. The gearbox 120 may output the propulsion torque to wheels 150 of the vehicle 100 via an output shaft 175 connected to an output node 155.

Each clutch used in the vehicle 100, such as a first clutch 160, a second clutch 165, and a third clutch 170, may include any number of devices configured to engage to transfer the torque generated by one component of the vehicle 100 to another. The amount of torque transferred may be referred to as a "reactive torque" of the clutch. To transfer the reactive torque, each clutch 160, 165, and 170 may include a driving mechanism and a driven mechanism. The driving mechanism may be configured to rotate when provided with, e.g., the engine torque, the first motor torque, the second motor torque, etc. When fully engaged, the driven mechanism may rotate at the same speed as the driving mechanism. When disengaged or partially engaged, however, the driven mechanism is free to slip relative to the driving mechanism, allowing the driving mechanism and the driven mechanism to rotate at different speeds.

The first clutch 160 may be grounded (e.g., the driven mechanism is fixed and does not rotate) and operably connected to the first input node 140 of the gearbox 120. When the first clutch 160 is engaged, the first clutch 160 may prevent one or more gears in the gearbox 120 from rotating so that the second motor torque may be transferred from the second input node 145 to the output node 155 to propel the vehicle 100. The second clutch 165 may be operably disposed between the first motor 110 and the first input node 140. When the second clutch 165 is engaged, the first motor torque may be transferred from the first motor 110 to the first input node 140 so that the vehicle 100 may be propelled, at least in part, by the first motor torque (e.g., the first motor torque contributes to the propulsion torque). The third clutch 170 may be operably disposed between the engine 105 and the first motor 110. When the third clutch 170 is engaged, the engine torque may be transferred to the first motor 110 so that the first motor 110 may act as a generator if the second clutch 165 is disengaged or so that the engine torque alone or in combination with the first motor torque may be transferred to the first input node 140 of the gearbox 120 if the second clutch 165 is engaged.

The vehicle 100 may operate in various modes based on, for example, which of the first clutch 160, the second clutch 165, and/or the third clutch 170 are engaged. That is, the first clutch 160 may be engaged during a first operating mode, a second operating mode, and a fifth operating mode. The second clutch 165 may be engaged during the second operating mode, a third operating mode, and a fourth operating mode. The third clutch 170 may also be engaged during the fourth operating mode, as well as during the fifth operating mode. The second clutch 165 may engage during the transition from the first operating mode to the second operating mode, and the third clutch 170 may engage during the transition from the third operating mode to the fourth operating mode. Accordingly, the first clutch 160 may disengage during the transition to the third operating mode. The second clutch 165 may disengage during the transition to the fifth operating mode and the third clutch 170 may disengage during the transition to the first operating mode.

Each clutch may be hydraulically operated. For example, each clutch may be configured to engage when provided with fluid at a minimum threshold (e.g., the capacity of the clutch is commanded to a level above the minimum threshold so that the clutch transfers torque). Each clutch may be further configured to disengage when provided with fluid below the minimum threshold (e.g., the capacity of the clutch is commanded to a level below the minimum threshold, such as zero). A pump or valve body (not shown) may be used to provide the fluid to one or more of the clutches in the vehicle 100, and the amount of fluid provided may be based on a clutch fill command, described in greater detail below. The capacity of each clutch may be based on, e.g., a clutch torque command, discussed below.

Furthermore, each clutch may be synchronized (i.e., slip is controlled to zero) before the driving mechanism and the driven mechanism are engaged to, for instance, reduce driveline disturbances and/or reduce the risk of damaging the clutch upon engagement. In one possible approach, the engine 105, the first motor 110, or the second motor 115 may be configured to increase or decrease the speed of the driven mechanism of one or more of the clutches to substantially match the speed of the driving mechanism of that same clutch. When the speeds of the driving mechanism and the driven mechanism are substantially the same, the slip speed of the clutch is substantially zero so the clutch may be engaged without a significant risk of creating a driveline disturbance or damaging that clutch. By way of example, the third clutch 170, as illustrated, is operably disposed between the engine 105 and the first motor 110. The engine 105 may be configured to rotate the driving mechanism so that the engine torque is transferred to the first motor 110 when the third clutch 170 is engaged. The first motor 110, therefore, may be configured to increase or decrease the speed of the driven mechanism of the third clutch 170 to substantially match the speed of the driving mechanism prior to the engagement of the third clutch 170.

The controller 130 may include any device configured to identify a transition from a present operating mode to a target operating mode and identify one or more of the clutches (e.g., the first clutch 160, the second clutch 165, or the third clutch 170) in the vehicle 100 as an off-going clutch based on, e.g., which of the clutches disengages at some point during the identified transition. The controller 130 may be further configured to control the disengagement of the off-going clutch during the transition and determine whether the off-going clutch disengaged properly.

Continuing with the example operating modes described above where the first and second clutches 160, 165 are engaged when the vehicle 100 is operating in the second operating mode and only the second clutch 165 is engaged when the vehicle 100 is operating in the third operating mode, the controller 130 may control the disengagement of the first clutch 160 during a transition from the second operating mode to the third operating mode. During this transition to the third operating mode, the controller 130 may be configured to identify the second operating mode as the present operating mode and the third operating mode as the target operating mode. The controller 130 may also be configured to identify the first clutch 160 as the off-going clutch. However, when transitioning to other target operating modes, the controller 130 may be configured to identify any of the other clutches in the vehicle 100 as the off-going clutch. By way of example only, the third clutch 170 may disengage during a transition to the first operating mode, so during that transition, the controller 130 may be configured to identify the third clutch 170 as the off-going clutch. The controller 130 may identify the off-going clutch after identifying the start of the transition to the target operating mode. Alternatively, the controller 130 may proactively identify the off-going clutch based on the present operating mode and other factors or driving conditions such as, e.g., the present speed of the vehicle 100, driver inputs, etc.

To control the off-going clutch during the transition, the controller 130 may be configured to determine an expected slip direction of the off-going clutch based on a shift path to the target operating mode. The shift path may include one or more intermediate operating modes in addition to the target operating mode. For instance, when in the present operating mode, the vehicle 100 may pass through a first intermediate operating mode and a second intermediate operating mode before operating in the target operating mode. The controller 130 may be configured to determine the expected slip direction based on an expected rotation of, e.g., the driving mechanism of the off-going clutch in either a first direction or a second direction for any operating mode along the shift path. In addition or alternatively, the controller 130 may use the target operating mode to determine an expected slip speed that, e.g., includes an expected magnitude and direction of the slip, and the controller 130 may be configured to derive the expected slip direction from the direction of the expected slip speed.

The expected slip direction may be based, at least in part, on one or more operating modes along the shift path such as the target operating mode or one or more intermediate operating modes between the present operating mode and the target operating mode. The controller 130 may use, e.g., the speed degrees of freedom of the gearbox 120 when the vehicle 100 is operating in one or more of the intermediate operating modes to determine the expected slip direction.

In one possible approach, if the gearbox 120 has an output speed and an input speed degree of freedom when operating in the first intermediate operating mode, the controller 130 may look to the second intermediate operating mode, which may have a single speed degree of freedom (e.g., an output speed of the gearbox 120). The controller 130 may use this single speed degree of freedom to determine, for instance, the target input speed of the gearbox 120 during the first intermediate operating mode. Alternatively, the controller 130 may be configured to recognize that one of the intermediate operating modes has multiple speed degrees of freedom and move on to a subsequent intermediate operating mode that only has one speed degree of freedom.

The controller 130 may be configured to use the single speed degree of freedom (e.g., the output speed of the gearbox 120) of the second intermediate operating mode to calculate the expected slip direction of the off-going clutch during the transition out of the present operating mode and into the first intermediate operating mode along the shift path to the target operating mode. That is, the expected slip speed and the expected slip direction may be calculated, at least in part, from the output speed and the target input speed of the gearbox 120 when operating in the target operating mode. If an operating mode has more than two degrees of freedom, such as neutral, the controller 130 in one possible approach may be configured to determine the expected slip direction to be the direction in which the off-going clutch is presently loaded.

Once the expected slip direction is determined, the controller 130 may be configured to define a non-zero value based, at least in part, on the expected slip direction to control the off-going clutch. The non-zero value may be used to control the reactive torque of the off-going clutch during the transition to the target operating mode, and in one possible approach, the controller 130 may be configured to only disengage the off-going clutch after the reactive torque is substantially equal to the non-zero value. The controller 130 may be configured to define the non-zero value to include any non-zero number, such as a calibration magnitude based on, e.g., calibration data stored in a look-up table, database, data repository, or other type of data store. The magnitude of the non-zero value may be selected to cause the off-going clutch to slip without creating a drive disturbance that is noticeable to a driver of the vehicle 100 when the off-going clutch is disengaged.

The controller 130 may be further configured to define the non-zero value to accommodate the expected slip direction. For instance, the controller 130 may define the non-zero value as a positive number if the expected slip direction is the first direction or a negative number if the expected slip direction is the second direction. The non-zero number, therefore, may cause the off-going clutch to slip in the same direction as the expected slip direction. That is, whether the non-zero value is a positive number or a negative number may control the direction that the driving mechanism of the off-going clutch will rotate relative to the driven mechanism after the off-going clutch is disengaged.

During the transition to the target operating mode, and before disengaging the off-going clutch, the controller 130 may be configured to command the reactive torque of the off-going clutch to approach the non-zero value. For example, the reactive torque may be bound by a torque constraint, which may converge toward the non-zero value during the transition to the target operating mode or any intermediate operating mode along the shift path to the target operating mode. The controller 130 may be configured to command the reactive torque to be within the torque constraint. As the torque constraint converges toward the non-zero value, the controller 130 may command the reactive torque to approach the non-zero value.

Disengaging the off-going clutch while the reactive torque is substantially greater in magnitude than the non-zero value may cause an excessive amount of slip that could create a noticeable driveline disturbance or possibly damage the off-going clutch. As such, the controller 130 may be configured to maintain the engagement of the off-going clutch at least until the reactive torque of the off-going clutch is substantially equal to the non-zero value. At that time, the controller 130 may be configured to disengage the off-going clutch by, e.g., commanding the capacity of the off-going clutch to substantially zero or some other capacity below the minimum threshold needed to maintain the engagement of the off-going clutch. The controller 130 may be configured to generate the clutch fill command and the clutch torque command to control the engagement, disengagement, and capacity of the off-going clutch. In some instances, the controller 130 may be configured to transmit the clutch torque command, the clutch fill command, or both, to another device within the vehicle 100 to indirectly control the operation of the off-going clutch.

The controller 130 may be configured to determine whether the off-going clutch has successfully disengaged after, e.g., commanding the capacity of the off-going clutch to zero or another capacity that under normal circumstances would cause the off-going clutch to disengage. For instance, the controller 130 may monitor the off-going clutch to observe whether the driving mechanism of the off-going clutch is slipping relative to the driven mechanism in accordance with the reactive torque commanded at the non-zero value. As discussed above, commanding the reactive torque to the non-zero value may cause the driving mechanism to rotate relative to the driven mechanism, causing the off-going clutch to slip. The magnitude of the non-zero value may define the slip acceleration and the sign of the non-zero value may define the direction of the expected slip speed. The controller 130, therefore, may be configured to observe the slip speed of the driving mechanism relative to the driven mechanism. The controller 130 may be configured to determine whether the off-going clutch has successfully disengaged based on, for instance, whether the observed slip speed is substantially equal to zero. If so, the controller 130 may determine that the off-going clutch did not successfully disengage. If, however, the controller 130 observes a substantially non-zero slip, the controller 130 may determine that the off-going clutch has successfully disengaged.

The controller 130 may be configured to identify a clutch failure if, e.g., the controller 130 concludes that the off-going clutch has failed to disengage despite the controller 130 commanding the capacity of the off-going clutch to zero or some other capacity below the minimum threshold needed to keep the off-going clutch engaged. In one possible approach, the controller 130 may be configured to identify the failure based on whether slip is observed after commanding the off-going clutch to disengage. Therefore, the controller 130 may be configured to observe the slip speed of the off-going clutch for at least a predetermined amount of time after sending the clutch torque command. If no slip is observed during that predetermined amount of time, the controller 130 may be configured to identify the clutch failure that indicates that the off-going clutch did not disengage properly. In one possible approach, the controller 130 may be configured to take a remedial action, such as illuminating a light on a dashboard of the vehicle 100 and/or setting a flag placing the vehicle 100 in a fail or limp-home mode, if the expected slip is not observed. Alternatively, the controller 130 may simply wait for the off-going clutch to disengage.

Should the controller 130 fail to observe a substantially non-zero slip speed after exhausting the clutch capacity, the controller 130 may be configured to attempt to induce slip by further loading the off-going clutch in the same direction as the expected slip direction. That is, the controller 130 may increase the magnitude of the load on the off-going clutch by commanding the reactive torque constraints, and thus the reactive torque, to a magnitude that increases the load on the off-going clutch.

In general, computing systems and/or devices, such as the controller 130, etc., may employ any of a number of computer operating systems and may include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

Figure 2:
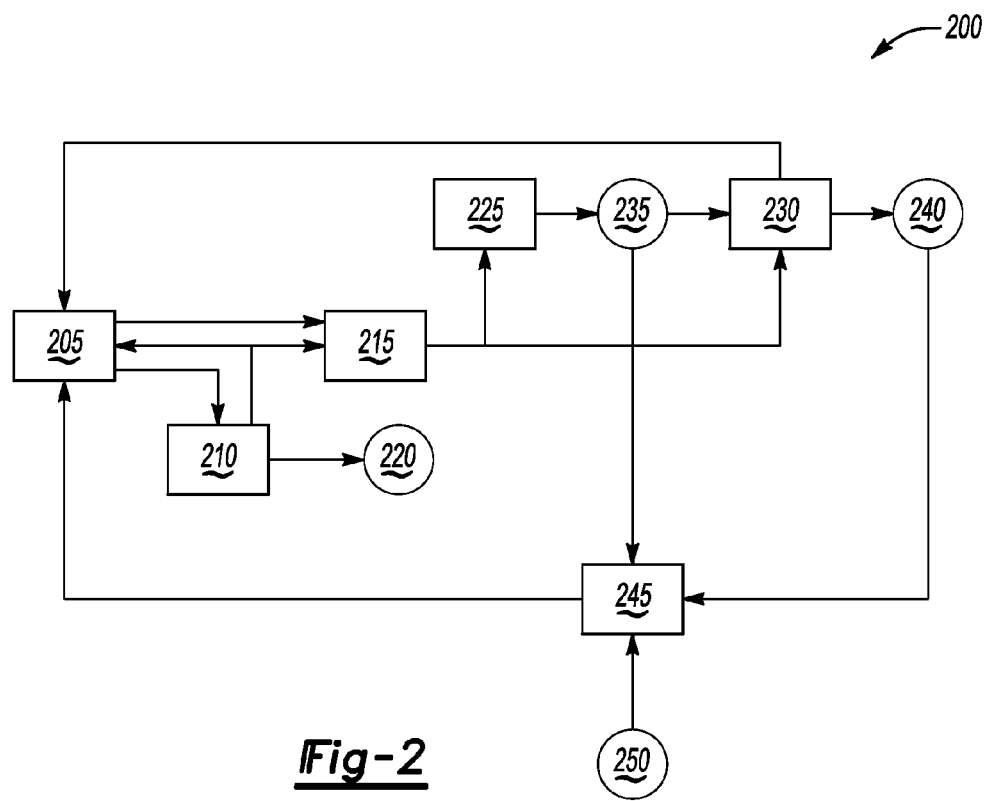
FIG. 2 illustrates an example signal flow diagram that may be used to control the off-going clutch during the transition to the target operating mode.

FIG. 2 illustrates an example signal flow diagram 200 that may be used to control the off-going clutch during the transition to the target operating mode. The diagram 200 includes a shift execution module 205, a clutch control module 210, a clutch capacity control module 215, hydraulic actuators 220, an engine optimization module 225, a motor optimization module 230, an engine control module 235, a motor control processor 240, and a slip calculation module 245.

The shift execution module 205 may generate one or more signals, such as the clutch torque command, that control the torque and/or capacity of one or more clutches in the vehicle 100 during transitions between the various operating modes of the vehicle 100. The shift execution module 205 may output the clutch torque command to the clutch control module 210. The shift execution module 205 may further output torque constraint override values to the clutch capacity control module 215. The torque constraint override values may be used, e.g., to converge the torque constraint toward the non-zero value during the transition to the target operating mode. The shift execution module 205 may generate these and other signals using information from one or more other modules illustrated in the signal flow diagram 200. For instance, the shift execution module 205 may generate one or more signals using a commanded reactive torque signal and an observed slip speed signal, described below.

The clutch control module 210 may generate a hydraulic command signal that may be output to one or more hydraulic actuators 220 (e.g., valves) that, upon receipt of the hydraulic command signal, may allow or prevent fluid flow to one or more of the clutches. The clutch control module 210 may further generate an estimated clutch capacity signal that is output to the shift execution module 205 and the clutch capacity control module 215.

The clutch capacity control module 215 may be used to generate a signal that represents the torque constraints in light of the torque constraint override values received from the shift execution module 205 and the estimated clutch capacity signal received from the clutch control module 210. The signals generated by the clutch capacity control module 215, therefore, may be used to converge the reactive torque toward the non-zero value. These signals may be output to the engine optimization module 225 and the motor optimization module 230.

The engine optimization module 225 may be configured to generate engine torque commands that may be output to the engine control module 235. In one possible approach, the engine torque commands may be generated in accordance with system constraints, including the capacity constraints of one or more clutches in the vehicle 100. The system constraints, however, may be overridden in some circumstances, such as during the off-going clutch operation. The engine control module 235 may use the engine torque commands to control the engine torque generated by the engine 105. The engine optimization module 225 may output a signal representing the engine torque to the motor optimization module 230.

The motor optimization module 230 may receive the signals representing the engine torque and the system torque constraints, including potentially overridden clutch capacity constraints as discussed above, to generate one or more motor torque command signals that, e.g., command the first motor 110 to generate the first motor torque and/or the second motor 115 to generate the second motor torque. The motor torque command signals may be output to the motor control processor 240. The motor optimization module 230 may be further configured to output the commanded reactive torque of one or more of the clutches back to the shift execution module 205.

The motor control processor 240 may be configured to control the operation of the first motor 110, the second motor 115, or both. Although only one motor control processor 240 is illustrated, the vehicle 100 may include any number of motor control processors 240. For instance, one motor control processor 240 may be used to control the first motor torque while another motor control processor 240 may be used to control the second motor torque.

A slip calculation module 245 may receive an engine speed signal from the engine control module 235 and a motor speed signal from the motor control processor 240. The slip calculation module 245 may further receive other signals from one or more speed sensors 250 used with the vehicle 100. The slip calculation module 245 may, e.g., generate a signal representing the observed slip speed and output that signal to the shift execution module 205.

FIG. 3 illustrates a flowchart of an example process 300 that may be implemented by the controller 130 during the transition to the target operating mode or any other (e.g., intermediate) operating mode along the shift path to the target operating mode.

At block 305, the controller 130 may identify the transition from the present operating mode of the vehicle 100 to the target operating mode of the vehicle 100. The operating mode of the vehicle 100 may be defined by various factors including which clutches are engaged, the speed of the vehicle 100, inputs from the driver of the vehicle 100, etc.

At block 310, the controller 130 may identify one of the clutches in the vehicle 100 as the off-going clutch based, at least in part, on the identified target operating mode. For instance, the controller 130 may identify the off-going clutch as one or more of, e.g., the first clutch 160, the second clutch 165, or the third clutch 170 depending on which of these clutches 160, 165, 170 disengages during the transition to the target operating mode. As discussed above, the off-going clutch may transfer torque in accordance with the reactive torque commanded by the controller 130.

At block 315, the controller 130 may determine the expected slip direction of the off-going clutch based, at least in part, on the target operating mode or the next operating mode along the shift path. For instance, the controller 130 may determine the expected slip direction based on the expected rotation of the off-going clutch when the vehicle 100 is in the next operating mode. That is, the controller 130 may determine that when the vehicle 100 is operating in the next operating mode, the driving mechanism of the off-going clutch will slip in either the first direction or the second direction relative to the driven mechanism. The controller 130, therefore, may identify the determined direction (e.g., the first direction or the second direction) as the expected slip direction. Alternatively, the expected slip direction may be derived from an expected slip speed. The expected slip speed may, in one possible approach, be represented by a number, and the sign (e.g., either positive or negative) of that number may indicate the expected slip direction. An example process 400 that the controller 130 may use to determine the expected slip direction is described below with respect to FIG. 4.

At block 320, the controller 130 may define the non-zero value based, at least in part, on the expected slip direction. The non-zero value may have a non-zero magnitude based on, e.g., a calibration magnitude stored in a look-up table, database, data repository, or any other type of data store. Moreover, the non-zero value may have a "sign" representing either a positive or negative number based on the expected slip direction. For instance, the first direction may be associated with a positive number and the second direction may be associated with a negative number. Accordingly, the controller 130 may define the non-zero value as a positive number if the expected slip direction is the first direction or as a negative number if the expected slip direction is the second direction.

At block 325, the controller 130 may control the reactive torque of the off-going clutch during the transition based, at least in part, on the non-zero value determined at block 320. For instance, the controller 130 may control the reactive torque of the off-going clutch to disengage the off-going clutch during the transition to the next operating mode. One example way for the controller 130 to control the reactive torque is described below with respect to FIG. 5.

FIG. 4 illustrates an example process 400 that may be implemented by the controller 130 to determine the expected slip speed and the expected slip direction of the off-going clutch. For instance, the process 400 may be implemented by the controller 130 at block 315 of FIG. 3.

At block 405, the controller 130 may identify which operating modes the vehicle 100 must transition through during the transition from the present operating mode to the target operating mode. In some instances, the vehicle 100 may transition direction directly from the present operating mode to the target operating mode. Alternatively, however, the vehicle 100 may transition through one or more intermediate operating modes during the transition.

At decision block 410, the controller 130 may determine whether the next operating mode, which may be the target operating mode or an intermediate operating mode, has a single speed degree of freedom. If so, the process 400 may continue at block 415. If not, the process 400 may continue at block 420.

At block 415, the controller 130 may calculate the expected slip speed and the expected slip direction based on the next operating mode during the transition and the speed degree of freedom identified at decision block 410. The process 400 may continue at block 440.

At decision block 420, the controller 130 may determine whether the next operating mode is the target operating mode. If so, the process 400 may continue at decision block 425. Otherwise, the process 400 may return to block 405.

At decision block 425, the controller 130 may determine whether the target operating mode has two speed degrees of freedom. If so, the process 400 may continue at block 430. If not, the process 400 may continue at block 435.

At block 430, the controller 130 may calculate the expected slip speed and the expected slip direction of the off-going clutch during the target operating mode based on, e.g., the two speed degrees of freedom identified at decision block 425. The process 400 may continue at block 440 after block 430.

At block 435, the controller 130 may determine that the expected slip speed is zero, which may indicate that the expected slip direction is unavailable or unknown. The process 400 may continue at block 440 after block 435.

At block 440, the controller 130 may output the expected slip direction. This way, the expected slip direction may be used in the process 300 of FIG. 3. The process 400, therefore, may end after block 440.

FIG. 5 illustrates an example process 500 that may be used by the controller 130 to control the reactive torque during the transition to the next operating mode using, e.g., the non-zero value determined during the process 300 of FIG. 3. The process 500 may accordingly be implemented at block 325 of FIG. 3.

At block 505, the controller 130 may override the torque constraints that bind the reactive torque. For instance, the controller 130 may use torque constraint override values and the commanded reactive torque to define a new torque constraint profile that may be used during the transition to the next operating mode, which may be the target operating mode or an intermediate operating mode.

At block 510, the controller 130 may apply the new torque constraint profile determined at block 505 to, e.g., converge the torque constraints toward the non-zero value. Since the reactive torque is controlled in accordance with the torque constraints, the controller 130 may further command the reactive torque toward the non-zero value.

At block 515, the controller 130 may maintain the engagement of the off-going clutch at least until the reactive torque of the off-going clutch is substantially equal to the non-zero value. For example, the controller 130 may command the capacity of the off-going clutch to a value sufficient to maintain the engagement of the driving mechanism and driven mechanism of the off-going clutch so that the off-going clutch may continue to transfer torque during the transition to the next operating mode. The commanded capacity may be based on, e.g., the commanded reactive torque and a calibrated margin.

At decision block 520, the controller 130 may determine whether the commanded reactive torque has reached the non-zero value. This way, the controller 130 may maintain the engagement of the off-going clutch until the reactive torque is substantially equal to the non-zero value. If the controller 130 determines that the reactive torque is not substantially equal to the non-zero value, the process 500 may continue at block 510 so that the controller 130 may continue to converge the torque constraints toward the non-zero value. If, however, the controller 130 determines that the reactive torque is substantially equal to the non-zero value, the process 500 may continue at block 525.

At block 525, the controller 130 may disengage the off-going clutch. That is, the controller 130 may command the capacity of the off-going clutch to substantially zero or some other capacity that is below a minimum threshold needed to maintain capacity of the off-going clutch. The controller 130 may control the capacity of the clutch using, for example, a clutch torque command.

At decision block 530, the controller 130 may determine whether the off-going clutch has successfully disengaged. For instance, the controller 130 may observe whether the driving mechanism of the off-going clutch has slipped relative to the driven mechanism of the off-going clutch. If so, the controller 130 may determine that the off-going clutch disengaged properly, and the process 500 may end. If the expected slip is not observed, the process 500 may continue at block 535.

At decision block 535, the controller 130 may, e.g., determine whether the estimated clutch capacity is less than the magnitude of the commanded reactive torque of the off-going clutch. If not, the controller 130 may return to block 530 to determine whether the off-going clutch has successfully disengaged. If the estimated clutch capacity is less than the magnitude of the commanded reactive torque, the process 500 may continue at block 540.

At block 540, the controller 130 may increase the magnitude of the reactive torque in the expected slip direction to a predetermined maximum value associated with the off-going clutch. The process 500 may return to block 530 to determine whether the off-going clutch has successfully disengaged.

Figure 6:
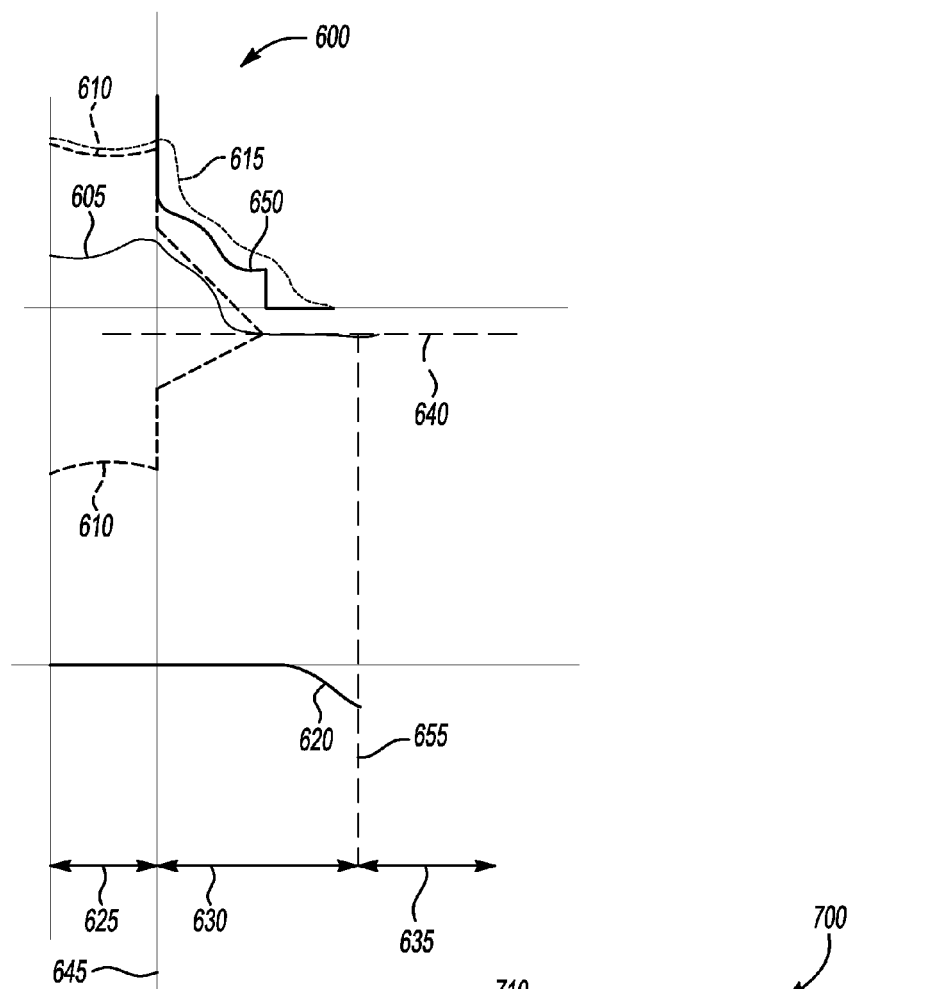
FIG. 6 illustrates an example graph of the reactive torque, the torque constraints, and the capacity of the off-going clutch during a transition to a next operating mode along a shift path.

FIG. 6 illustrates an example graph 600 of the reactive torque 605, the torque constraints 610, the capacity 615, and slip speed 620 of the off-going clutch at various times, including when the vehicle 100 is operating in the present operating mode, the next operating mode, which may be the target operating mode or an intermediate operating mode, and the transition from the present operating mode to the next operating mode. In the graph 600, the x-axis may represent time and the y-axis may represent magnitude. As illustrated, the present operating mode may be represented by a time period 625, the transition may represented by a time period 630, and the next operating mode may be represented by a time period 635. The magnitude of the non-zero value 640 used to control the reactive torque is illustrated as having a negative magnitude (e.g., below the x-axis) which may indicate that the expected slip direction is in the second direction, described above. Alternatively, if the expected slip direction were in the first direction, the non-zero value 640 may have a positive magnitude (e.g., above the x-axis).

During the time period 625 before the transition 630 to the next operating mode, the reactive torque 605 may be controlled normally by the controller 130 within the torque constraints 610. At the beginning of the transition 630, indicated by the line 645, the controller 130 may converge the torque constraints 605 toward the non-zero value 630. The controller 130 may further control the reactive torque 605 to be within the narrowing torque constraints 610. Moreover, the controller 130 may generate the clutch torque command 650 during the transition 630 to reduce the capacity of the off-going clutch while maintaining the engagement of the off-going clutch during the transition 630.

As illustrated, the transition 630 may end at line 655, which may further indicate the beginning of the time period 635 where the vehicle 100 is operating in the next operating mode, which may include the target operating mode or an intermediate operating mode. As such, the line 655 may mark the period of time when the torque constraints 610 are substantially equal to the non-zero value 640 and slip has been observed. The reactive torque 605, therefore, may be substantially equal to the non-zero value 630 at some moment in time before the line 655 (e.g., during the transition 630). When the reactive torque 605 is substantially equal to the non-zero value 630, the controller 130 may exhaust the capacity of the off-going clutch using the clutch torque command 650. Therefore, the clutch torque command 650 may drop to zero and the clutch fill command (not shown in FIG. 6) may indicate that the clutch should be exhausted at some time after the reactive torque 605 reaches the non-zero value 640. After the clutch torque command 650 commands the capacity of the off-going clutch to, substantially zero, the off-going clutch should begin to slip. The slip speed 620 of the off-going clutch may be zero during some or all of the transition 630 and have a non-zero magnitude at some point during the time period 635, indicating that the off-going clutch has successfully disengaged. The transition to the next operating mode may be complete as soon as the controller 130 observes that the off-going clutch has slipped.

Figure 7:
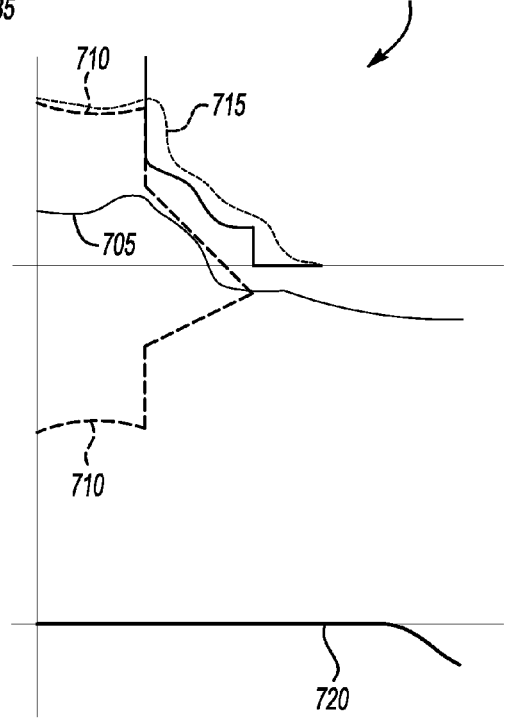
FIG. 7 illustrates another example graph of the reactive torque, the torque constraints, and the capacity of the off-going clutch during the transition to the next operating mode.

FIG. 7 illustrates another graph 700 of the reactive torque 705, the torque constraints 710, the capacity 715, and slip speed 720 of the off-going clutch at various times, including when the vehicle 100 is operating in the present operating mode, the next operating mode, and the transition from the present operating mode to the next operating mode if, e.g., the off-going clutch does not initially disengage.

For instance, if the controller 130 fails to observe that the off-going clutch has slipped following the point at which the estimated clutch capacity 715 has fallen below, e.g., the absolute value of the magnitude of the commanded reactive torque 705, the controller 130 may increase a magnitude of the load on the off-going clutch in the expected slip direction. That is, the controller 130 may command the converged torque constraints 710, and thus, the reactive torque 705, to a magnitude that increases the load on the off-going clutch to induce slip. The controller 130 may increase the load up to a predetermined threshold. If slip is observed, as illustrated by line 720, after increasing the load, the controller 130 may determine that the off-going clutch properly disengaged. If, however, no slip is observed, the controller 130 may identify a clutch failure and, if necessary, take an appropriate remedial action. Alternatively, the controller 130 may simply wait for the off-going clutch to disengage. The transition to the next operating mode may be complete as soon as the controller 130 observes slip that indicates that the off-going clutch properly disengaged.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an engine configured to generate an engine torque;
   a motor configured to generate a motor torque;
   a gearbox configured to receive at least one of the engine torque and the motor torque;
   a clutch configured to engage to transfer a reactive torque to at least one of the engine, the motor, and the gearbox, and wherein the clutch is configured to disengage during a transition from a present operating mode to a target operating mode; and
   a controller configured to determine an expected slip direction of the clutch, define a non-zero value based at least in part on the expected slip direction, and command the reactive torque to the non-zero value to control the clutch to induce slip during the transition from the present operating mode to the target operating mode.

2. A vehicle as set forth in claim 1, wherein the controller is configured to determine the expected slip direction based on an expected rotation of the clutch in either a first direction or a second direction.

3. A vehicle as set forth in claim 2, wherein the controller is configured to define the non-zero value as a positive number if the expected slip direction is the first direction and define the non-zero value as a negative number if the expected slip direction is the second direction.

4. A vehicle as set forth in claim 1, wherein the non-zero value is based at least in part on a calibration magnitude.

5. A vehicle as set forth in claim 1, wherein the reactive torque is bound by a torque constraint and wherein the controller is configured to converge the torque constraint toward the non-zero value during the transition from the present operating mode to the target operating mode.

6. A vehicle as set forth in claim 1, wherein the controller is configured to maintain the engagement of the clutch at least until the reactive torque of the clutch is substantially equal to the non-zero value.

7. A vehicle as set forth in claim 6, wherein the controller is configured to disengage the clutch when the reactive torque is substantially equal to the non-zero value.

8. A vehicle as set forth in claim 7, wherein the controller is configured to command a capacity of the clutch to substantially zero to disengage the clutch.

9. A vehicle as set forth in claim 8, wherein the controller is configured to determine whether the clutch has disengaged after commanding the capacity of the clutch to substantially zero.

10. A vehicle as set forth in claim 1, wherein the controller is configured to determine an expected slip speed and derive the expected slip direction based at least in part on the expected slip speed.

* * * * *